(12) United States Patent
Tsorng et al.

(10) Patent No.: US 11,687,131 B2
(45) Date of Patent: Jun. 27, 2023

(54) INTERNAL SUPPORT BRACKET FOR A POWER SWITCH OF A COMPUTING DEVICE

(71) Applicant: QUANTA COMPUTER INC., Taoyuan (TW)

(72) Inventors: Yaw-Tzorng Tsorng, Taoyuan (TW); Ming-Lung Wang, Taoyuan (TW); Jia-Lin Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 92 days.

(21) Appl. No.: 17/468,784

(22) Filed: Sep. 8, 2021

(65) Prior Publication Data
US 2023/0070601 A1   Mar. 9, 2023

(51) Int. Cl.
*G06F 1/18* (2006.01)
*H01R 13/707* (2006.01)
*H01H 23/08* (2006.01)
*H01H 23/24* (2006.01)

(52) U.S. Cl.
CPC ............. *G06F 1/189* (2013.01); *H01H 23/08* (2013.01); *H01R 13/707* (2013.01); *H01H 23/24* (2013.01)

(58) Field of Classification Search
CPC ...................................................... H05K 5/00
See application file for complete search history.

(56) References Cited

U.S. PATENT DOCUMENTS

| 8,514,551 B2 * | 8/2013 | Cosley | H02B 1/32 |
| | | | 361/635 |
| 2018/0351299 A1 * | 12/2018 | Kim | H04Q 1/02 |

* cited by examiner

*Primary Examiner* — Jerry Wu
(74) *Attorney, Agent, or Firm* — Nixon Peabody LLP

(57) ABSTRACT

An internal support bracket for a power switch includes a bottom support and a top cover. The top cover is secured to the bottom support. The combined bottom support and top cover define an aperture for securing the power switch. The bottom support includes a bottom surface with a ridge protruding therefrom. A method of securing a power switch to the interior of a computer chassis includes connecting a base support including a channel to an interior wall of the computer chassis. A power switch is positioned between a top cover and a separate bottom support. The separate bottom support includes a ridge protruding from a bottom surface. The top cover is secured to the separate bottom support. The ridge of the separate bottom support is slid into the channel such that the internal support bracket including the power switch is secured in a locked position.

17 Claims, 4 Drawing Sheets

INTERNAL SUPPORT BRACKET FOR A POWER SWITCH OF A COMPUTING DEVICE

FIELD OF THE INVENTION

The present invention relates generally to an internal support bracket, and more specifically, to an internal support bracket for a power switch secured to an interior chassis of a computing device.

BACKGROUND OF THE INVENTION

In current computing devices, a power switch for the power supply is typically installed from the exterior of computer chassis and penetrates a chassis side wall into the interior of the chassis. A cable from the power switch extends from the switch into the interior of the computer chassis. The cable is then connected via a butt connector to another cable for connection to the power supply disposed within the computer chassis. The servicing of a power switch during assembly or maintenance of a computing device can be cumbersome and can also lead to inefficient use of space within the computer chassis.

Accordingly, there is a need for improved power switch mechanisms and configurations that use less space and provide for increased efficiency in the building and maintenance of computing devices.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an internal support bracket for a power switch comprises a bottom support and a top cover secured to the bottom support. The combined bottom support and top cover define an aperture for securing the power switch. The bottom support includes a bottom surface with a ridge protruding therefrom.

In a further aspect, the internal support bracket further comprises a base support including a groove configured to receive the ridge to connect the bottom support to the base support. In a further aspect of the internal support bracket, the base support includes one or more through-holes configured to fasten the base support to a side wall structure of a computer chassis. In yet a further aspect of the internal support bracket, the top cover is secured to the bottom support with one or more fasteners. In a further aspect of the internal support bracket, the top cover is further secured to the bottom support with a friction fit. In yet another aspect of the internal support bracket, the top cover includes one or more protrusions from an interior surface defining a portion of a boundary of the aperture where the one or more protrusions mate with the power switch. In a further aspect of the internal support bracket, the bottom support includes one or more protrusions from an interior surface defining a portion of a boundary of the aperture where the one or more protrusions mating with the power switch.

In yet another aspect of the internal support bracket, the top cover and the bottom support include one or more protrusions from an interior surface defining a boundary of the aperture where the one or more protrusions mate with the power switch. In a further aspect of the internal support bracket, the ridge has a trapezoidal cross-section. In a further aspect of the internal support bracket, the ridge includes one or more blind holes.

In yet a further aspect of the internal support bracket, the groove includes one or more side walls having one or more nodules extending from the side wall into the groove. The one or more nodules are configured to engage corresponding blind holes in the ridge to secure the bottom support to the base support in a locked position. In a further aspect of the internal support bracket, the bottom support is configured to be slidingly installed and removed from the base support.

According to certain aspects of the present disclosure, a method for securing a power switch to the interior of a computer chassis comprises connecting a base support including a channel to an interior wall of a computer chassis. A power switch is positioned between a top cover and a separate bottom support of an internal support bracket. The separate bottom support includes a bottom surface having a ridge protruding therefrom. The top cover is secured to the separate bottom support of the internal support bracket. The ridge of the separate bottom support is slid into the channel such that the internal support bracket including the power switch is secured in a locked position.

In a further aspect of the method for securing the power switch, the positioning includes first placing the power switch into the separate bottom support of the internal bracket followed by sliding the top cover over the power switch. In a further aspect of the method for securing the power switch, the securing is implemented with one or more fasteners. In a further aspect of the method for securing the power switch, the connecting of the base support to the interior wall is implemented with one or more thumb screws.

A further aspect of the method of securing the power switch comprises sliding the ridge of the separate bottom support out of the channel. In yet a further aspect of the method of securing the power switch, the channel includes one or more nodules configured to engage one or more apertures in the ridge as the internal support bracket is moved to the locked position. In a further aspect of the method of securing the power switch, the channel includes one or more nodules configured to disengage with one or more apertures in the ridge as the internal support bracket is moved to an unlocked position.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The present disclosure, and its advantages, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
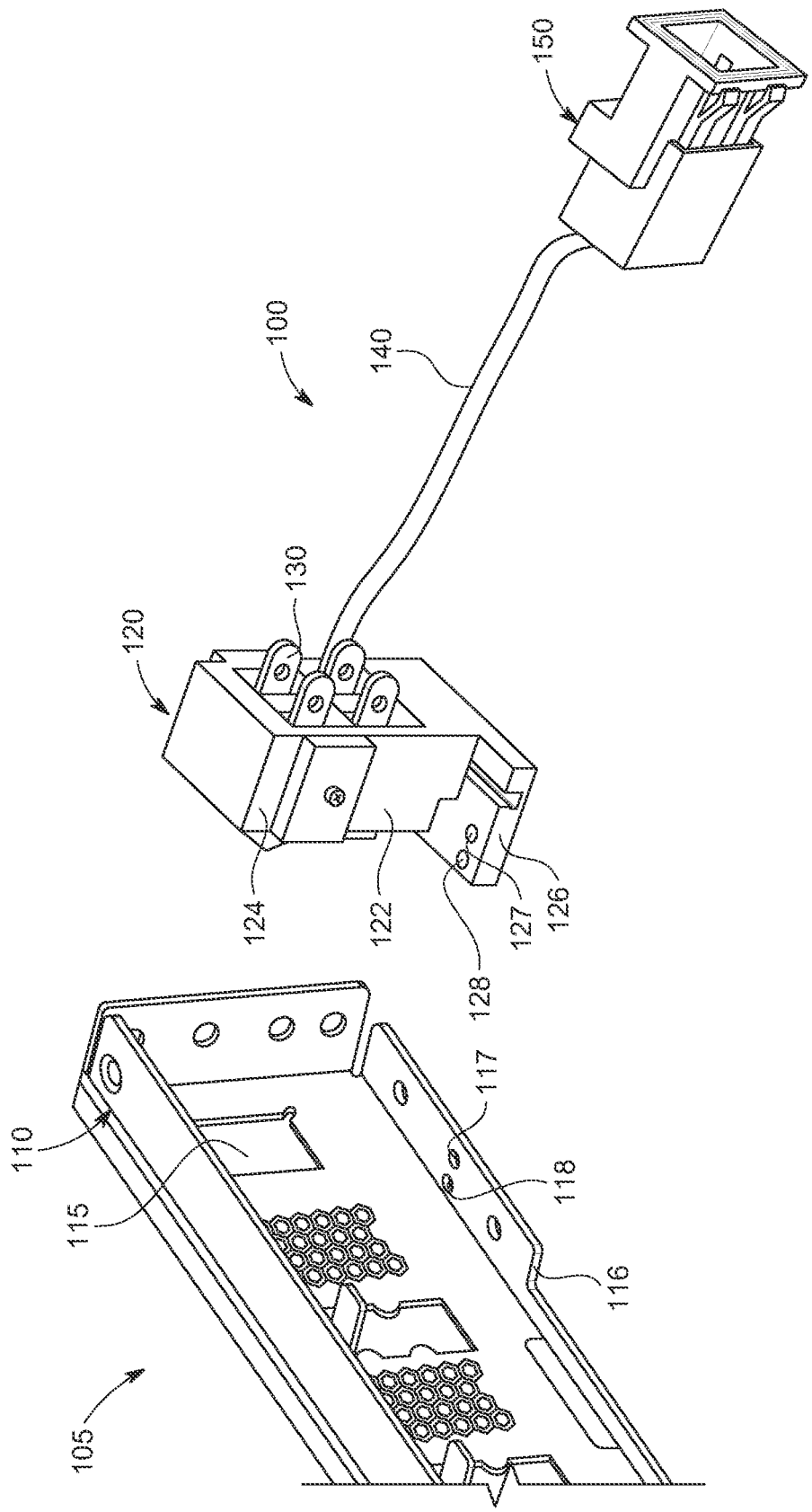
FIG. 1 is a top perspective view of an exemplary interior portion of a computer chassis, internal support bracket, and power switch for a computing device, according to some implementations of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

For the present disclosure, the term "computing device" refers to any electronically-powered or battery-powered equipment that has hardware, software, and/or firmware components, where the software and/or firmware components can be configured for operating features on the device.

In some implementations, an internal support bracket secures a power switch in an interior space of a computer chassis of a computing device. The internal support bracket includes a bottom support and a top cover. The top cover is secured to the bottom support. The bottom support includes a bottom surface having a ridge that protrudes from the bottom surface. The combined top cover and the bottom support define an aperture in which the power switch is secured.

In some aspects, a method is contemplated for securing a power switch in an interior space of a computer chassis. The method includes connecting a base support, including a channel or groove to an interior of a side wall structure of a computer chassis. A power switch is positioned between a top cover and a separate bottom support of an internal support bracket. The separate bottom support includes a bottom surface from which a ridge protrudes. The top cover is secured to the separate bottom support of the internal support bracket. When secured together, the top cover and the separate bottom support form a receiving aperture for securing the power switch. The ridge of the separate bottom support can slide into the channel such that the internal support bracket, including the power switch, is secured in a locked position.

The present disclosure provides an improved power switch configuration, including an internal bracket for securing a power switch in the interior space of a computer chassis. With the power switch secured within the interior space of the computer chassis, a single cable can be extended from power switch for connection to the power supply of the computing device. In contrast, power switch configurations typically have needed a butt connector, or similar connection device, to connect two cables, one cable extending to the interior from a switch secured at the exterior of the computer chassis and the other cable extending from the butt connector to the power supply. The configuration of the present disclosure is particularly desirable as it allows for a more efficient use of the interior space of a computer chassis and more efficient assembly and maintenance of a computing device by providing an internal support bracket to secure the power switch at the interior side of a side wall structure of a computer chassis.

Turning now to FIG. 1, a top perspective view is depicted of an exemplary partial interior space 100 of a computer chassis defined on one side by a side wall structure 110 and an internal support bracket 120 for securing a power switch 130 for a computing device. The internal support bracket 120 is depicted separated from the side wall structure 110, although in an assembled position, the internal support bracket 120 would otherwise be fastened to the side wall structure 110. The side wall structure 110 includes a switch-receiving aperture 115 that aligns with a power switch 130 when the power switch 130 is fastened to the side wall structure 110 using the internal bracket structure 120. The power switch 130 penetrates the switch-receiving aperture 115 from the interior 100 of the computer chassis to allow user access to operate the power switch 130, though the power switch 130 itself is substantially within the interior 100 of the computer chassis.

The side wall structure 110 includes a lower bracket 116 having one or more holes 117, 118 used to secure a base support 126 for the internal bracket structure 120 to the lower bracket 116. The internal support bracket 120 includes a bottom support 122 and a top cover 124 that support the power switch 130. The top cover 124 is secured to the bottom support 122, and the bottom support 122 is secured to a base support 126, which in turn is secured to the lower bracket 116 when the power switch 130 is fully installed in a computing device. In some implementations, such as depicted in FIG. 1, the bottom support 122 and the base support 126 are separate units. In some implementations, the bottom support 122 and the base support 126 are a one-piece, unitary structure. A cable 140 extends from power switch 130 and connects to an electrical connector 150, which is configured to connect to a power supply (not shown) or to another connector and/or cable (not shown) that connects to a power supply. In some implementations, the base support 126 includes one or more through-holes 127, 128 that align with corresponding holes, such as fastening holes 117, 118 in the side wall structure 110. The through-holes 127, 128 are configured to allow the base support to be fastened to the side wall structure 110, such as at the lower bracket 116 of the side wall structure 110.

A desirable aspect of the present disclosure is having the power switch 130 being installed from the interior 100 of the computer chassis. Specifically, the power switch 130 partially extends from the interior 100 to the exterior 105 of the side wall structure 110, accommodating the user to access and operate the power switch 130 from the exterior 105 of the computer chassis.

Figure 2A:
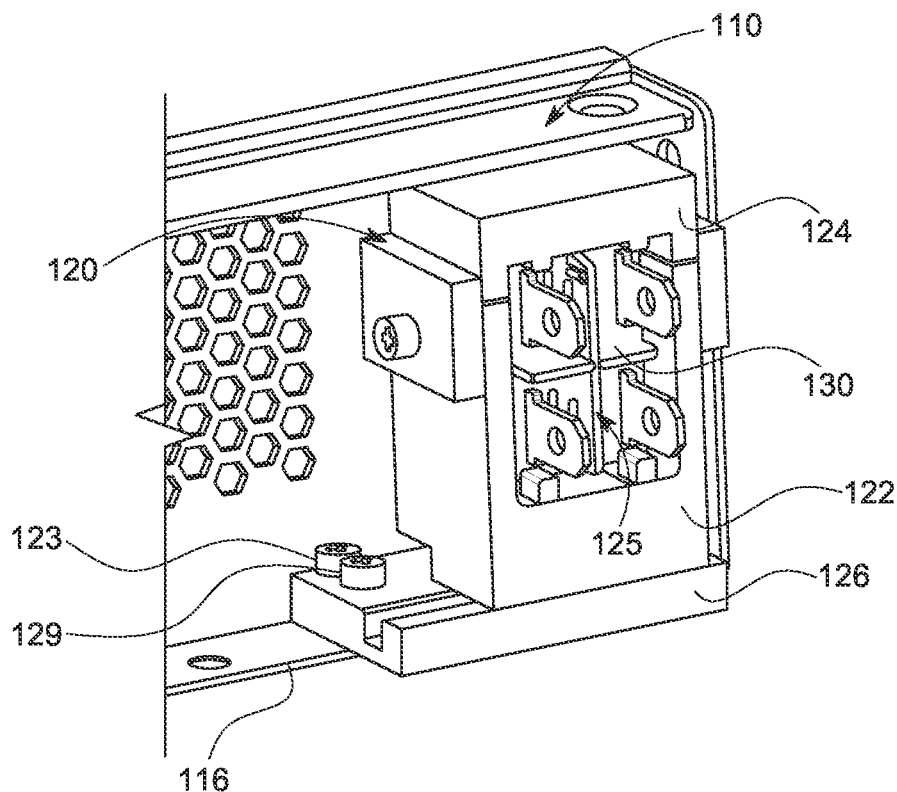
FIG. 2A a is top interior perspective view of the internal support bracket and power switch secured to a side wall structure of the computer chassis of FIG. 1, according to some implementations of the present disclosure.

Referring to FIG. 2A, a top interior perspective view depicts the internal support bracket 120 and the power switch 130 secured to a side wall structure 110 in the interior 100 (see FIG. 1) of the computer chassis of FIG. 1. The top cover 124 and the bottom support 122 define the boundaries of an aperture 125 where the power switch 130 is disposed and secured within the internal support bracket 120. The bottom support 122 is connected to the base support 126. The base support 126 is secured to the side wall structure 110 at the lower bracket 116 using one or more mechanical fasteners, such a screws 123, 129. In some implementations, the screws 123, 129 can be thumb screws. Other fastening mechanisms are contemplated as well that provide a fixed connection between the internal support bracket 120 and a computer chassis component, such as the side wall structure 110.

Figure 2B:
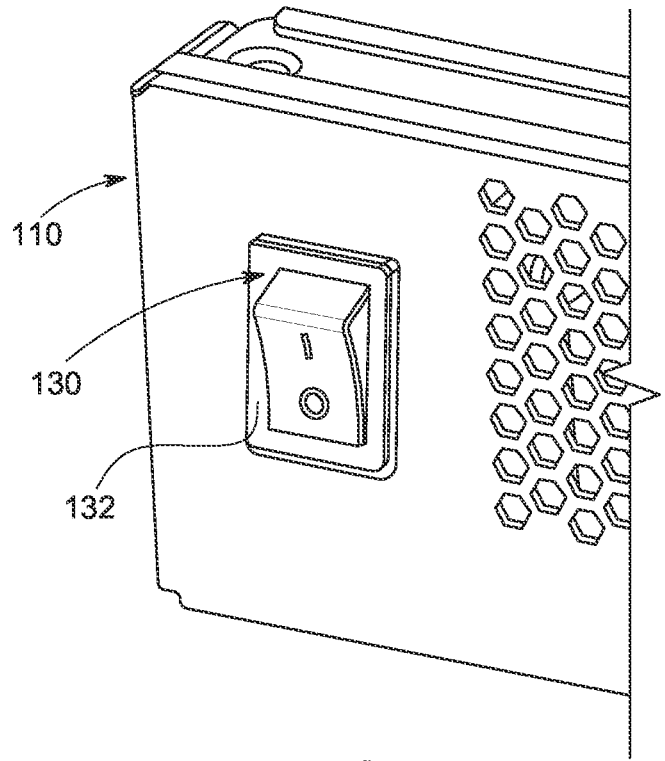
FIG. 2B a is top exterior perspective view of the power switch secured to the side wall structure of FIG. 1, according to some implementations of the present disclosure.

Referring to FIG. 2B, a top exterior perspective view depicts the power switch 130 in FIG. 2A secured to the side wall structure 110. An exterior portion 132 of the power switch 130 from FIG. 2A extends to out of the interior space 100 (see FIG. 1) of the computer chassis to the exterior 105 (see FIG. 1) of the side wall structure 110. As depicted in FIGS. 2A and 2B, the power switch 130 is substantially disposed on the interior side of side wall structure 110, and the exterior portion 132 of the power switch 130 minimally extends to the exterior of the side wall structure 110 to allow a computing device user to operate the power switch 130.

Figure 3B:
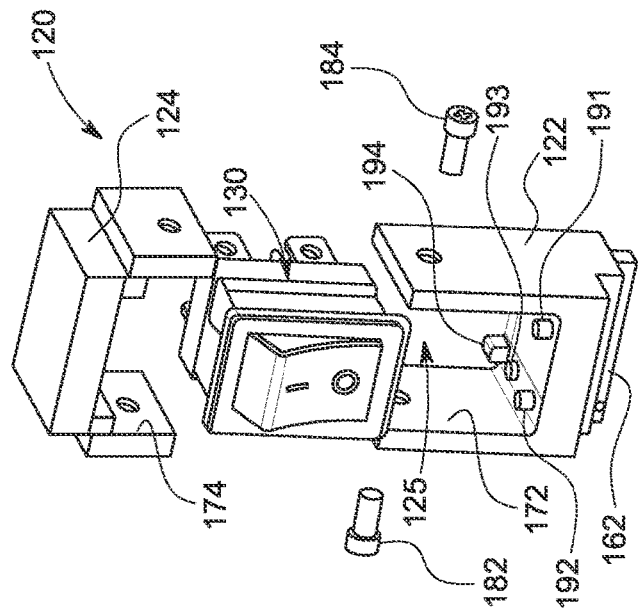
FIGS. 3A and 3B are assembled and exploded top perspective views of the internal support bracket and power switch of FIG. 1, according to some implementations of the present disclosure.
Figure 3D:
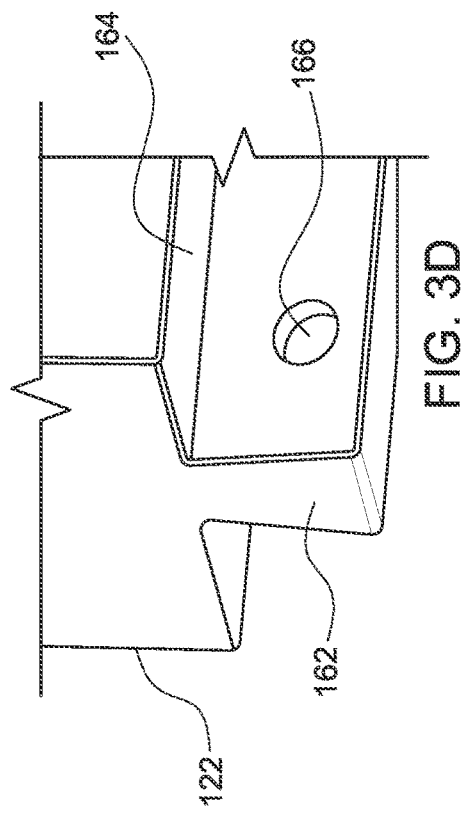
FIGS. 3C and 3D are bottom perspective views of a top cover and a bottom support of the internal support bracket of FIGS. 3A and 3B, according to some implementations of the present disclosure.
Figure 3A:
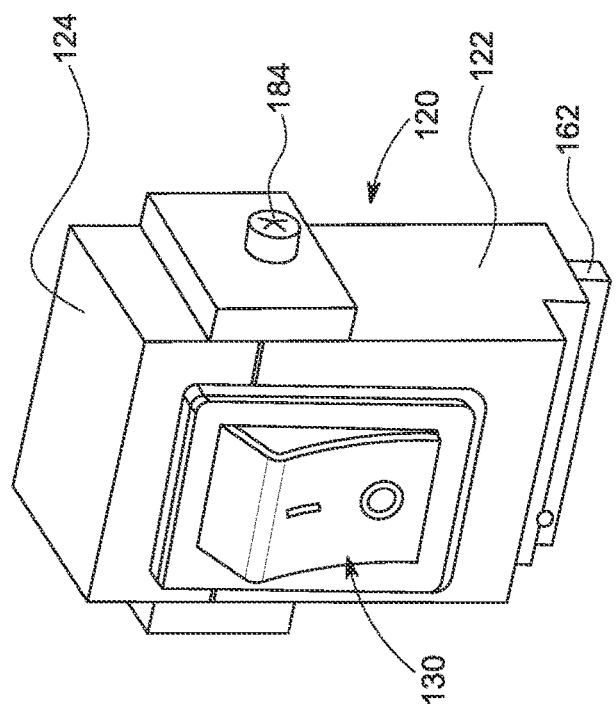

Referring to FIGS. 3A and 3B, assembled and exploded top perspective views depict the internal support bracket 120 and power switch 130 of FIG. 1. As shown in FIG. 3B, a two-part or multi-part structure for the internal support bracket 120 can be desirable, such as the top cover 124 and bottom support 122 configuration. The internal support bracket 120 is contemplated to be fabricated from a plastic material, which can be more easily deformed than metal, thereby allowing the power switch 130 to be more easily positioned and secured within a receiving aperture 125 defined by the interior boundaries 172, 174 of the bottom support 122 and the top cover 124.

The top cover 124 can be secured to the bottom support 122 with one or more mechanical fasteners, such as lateral screws 182, 184, or a similar fastening device. In some implementations, the lateral screws 182, 184 may make contact with the power switch 130 disposed within the receiving aperture 125, such as by making surface contact or penetration of the power switch 130. The contact between the lateral screws 182, 184 and the power switch 130 can assist with securing the power switch 130 within the internal support bracket 120. In some implementations, the power switch 130 is secured using a friction fit with the internal support bracket 120. In some implementations, the bottom support 122 may include one or more protrusions 191, 192, 193, 194 from the interior boundary 172 to secure the power switch 130, such that is does not move within the receiving aperture 125 when the top cover 124 is secured to the bottom support 122.

In some implementations, the bottom support 122 can further include a ridge 162 extending downwardly from the bottom support 122. The ridge 162 can be used to interface the internal support bracket 120 with another structure for securing the internal support bracket 120 and power switch 130 to a computer chassis.

Figure 3C:
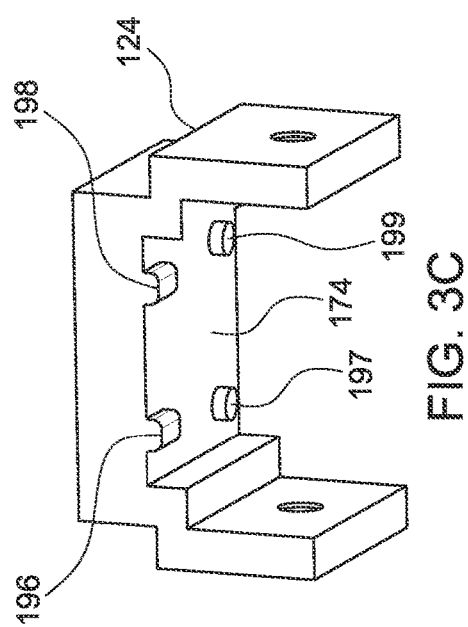

Referring to FIGS. 3C and 3D, bottom perspective views depict a top cover 124 and a bottom support 122 of the internal support bracket 120 of FIGS. 3A and 3B. The top cover 124 can also include one or more protrusions 196, 197, 198, 199 from an interior boundary 174 to secure the power switch 130 (FIG. 3A) such that is does not move within the receiving aperture 125 when the top cover 124 is secured to the bottom support 122. In some implementations, both the top cover 124 and the bottom support 122 include such protrusions. For example, the top cover 124 and the bottom support 122 can include one or more protrusions, such as protrusions 191, 192, 193, 194 (FIG. 3B) and/or protrusions 196, 197, 198, 199, that extend from an interior surface 172, 174 that defines a boundary of the receiving aperture 125 (FIG. 3B). The one or more protrusions can then mate with the power switch 130 to secure the power switch within the receiving aperture 125.

FIG. 3D depicts a close-up perspective view of the ridge 162 extending from a bottom surface 164 of the bottom support 122. In some implementations, the ridge 162 can have a trapezoidal transverse cross-section, as depicted in FIG. 3D. Other cross-sectional shapes are also contemplated that correspond to a groove or channel, as discussed further below. The ridge 162 can include one or more holes 166, such as a blind hole or a through-hole.

Figure 4B:
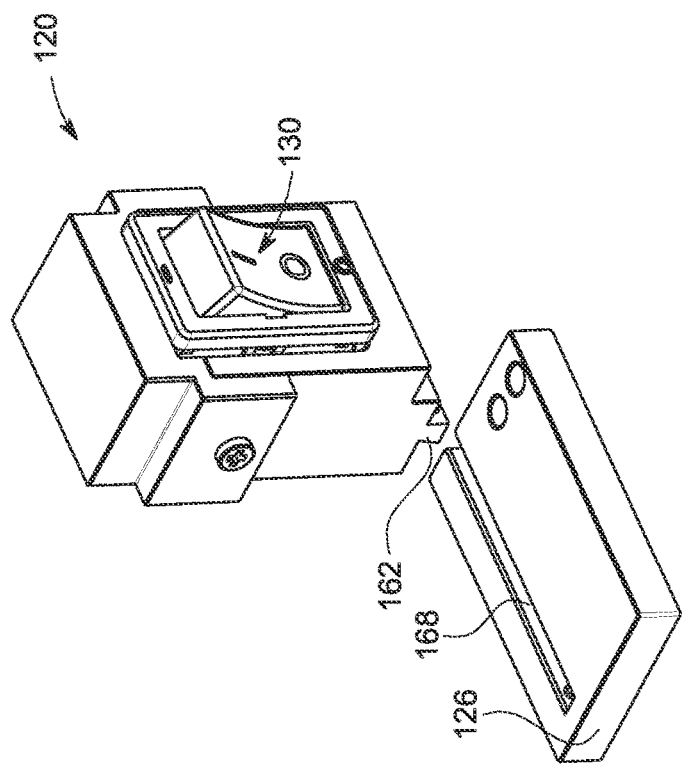
FIG. 4B is a top perspective view of the internal support bracket, the power switch, and the base support of FIG. 4A with the internal support bracket disconnected from the base support, according to some implementations of the present disclosure.
Figure 4D:
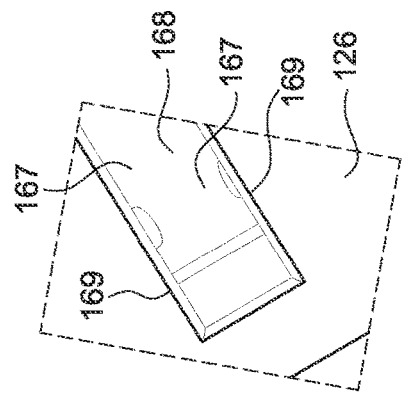
FIG. 4D is a partial top view of the groove of the base support, according to some implementations of the present disclosure.
Figure 4A:
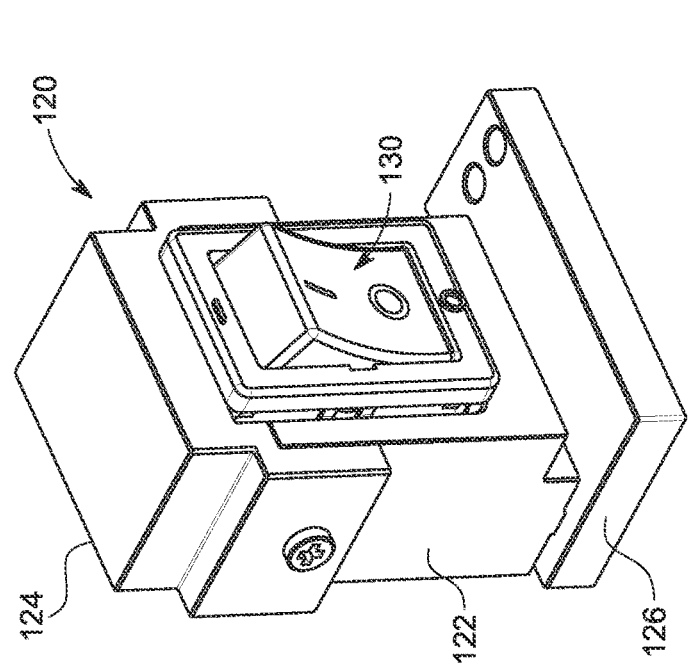
FIG. 4A is a top perspective view of an internal support bracket and power switch slidingly connected to a base support secured to a computer chassis, according to some implementations of the present disclosure.

Referring to FIG. 4A, a top perspective view depicts an internal support bracket 120 and power switch 130 connected to a base support 126 via a sliding connection between the base support 126 and the bottom support 122. The internal support bracket 120 is depicted in FIG. 4A in a locked position with the base support 126 where the internal support bracket 120 is in a fully installed position to secure the power switch 130.

Referring to FIG. 4B, a top perspective depicts of the internal support bracket 120, the power switch 130, and the base support 126 of FIG. 4A with the internal support bracket 120 disconnected from the base support 130. The base support 126 includes a groove 168 that corresponds to and is configured to receive the ridge 162, such as through a sliding connection that connects the bottom support 122 to the base support 126. Similarly, the sliding connection can also allow the disconnection of the bottom support 122 from the base support 126 by sliding the ridge 162 of the base support 126 out of the groove 168.

Figure 4C:
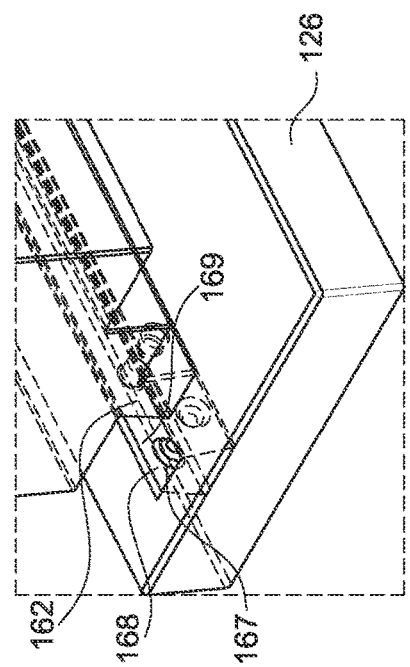
FIG. 4C is a top perspective view of the bottom support of the internal support bracket being slidingly connected to a groove of the base support, according to some implementations of the present disclosure.

Referring to FIG. 4C, a top perspective view depicts the bottom support 122 of the internal support bracket 120 as the bottom support 122 is being slidingly connected along the groove 168 of the base support 126. The groove 168 may include side walls 169 that form a channel for guiding the ridge 162. The side walls 169 can include one of more nodules 167 protruding or extending from the side walls 169. The nodules 167 are positioned to engage corresponding holes or apertures, such as hole 166 in FIG. 3D, in the ridge 162 to secure the bottom support 122 in a locked position when the nodule 167 penetrates a corresponding hole or aperture. In some implementations, the hole may be a through-hole or a blind hole. Referring to FIG. 4D, a partial top view depicts the groove 168 of the base support 126, including the nodules 167 and side walls 169.

The implementations described for FIGS. 1 to 4D are also contemplated for implementation as a method for securing a power switch to the interior of a computer chassis. Using the element number of FIGS. 1 to 4D, the method includes connecting a base support 126 including a channel or groove 168, to a side wall structure wall 110 of a computer chassis. A power switch 130 is positioned between a top cover 124 and a separate bottom support 122 of an internal support bracket 120. The separate bottom support 122 includes a bottom surface 164 having a ridge 162 protruding therefrom. The top cover 124 is secured to the separate bottom support 122 of the internal support bracket 120. The ridge 162 of the separate bottom support 122 can be slid into the channel or groove 168 such that the internal support bracket 120, including the power switch 130, is secured in a locked position.

In some implementations, the positioning step includes first placing the power switch 130 into the separate bottom support 122 of the internal support bracket 120, followed by sliding the top cover 124 over the power switch 130. In a further aspect, the securing step is implemented with one or more fasteners, such as lateral fasteners 182, 184. In a further aspect, connecting the base support 126 to the side wall structure 110 is implemented with one or more thumb screws. A further aspect includes sliding the ridge 162 of the separate bottom support 122 out of the channel or groove 168. In yet a further aspect, the groove 168 includes one or more nodules 167 configured to engage one or more apertures 166 in the ridge 162 as the internal support bracket 120 is moved to the locked position. In a further aspect, the groove 168 includes one or more nodules 167 configured to disengage with one or more apertures 166 in the ridge 162 as the internal support bracket 120 is moved to an unlocked position.

The implementations described above for FIGS. 1 to 4D are primarily in the context of an internal support bracket for a power switch of a computing device, or a method of securing a power switch to the interior of a computer chassis. However, the described internal support bracket and methods are applicable to other types of applications for supporting electronic components on the interior of a computer chassis. The described internal support bracket for a power switch has been presented by way of example only, and not limitation, and can include different combinations of the described elements.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An internal support bracket for a power switch, the internal support bracket comprising: a bottom support; and a top cover secured to side walls of the bottom support, the combined bottom support and top cover defining an aperture for securing a boundary of the power switch, the bottom support including a bottom surface with a ridge protruding therefrom; and a base support including a groove configured to receive the ridge to connect the bottom support to the base support; and the bottom support is configured to be slidingly installed and removed from the base support.

2. The internal support bracket of claim 1, wherein the base support includes one or more through-holes configured to fasten the base support to a side wall structure of a computer chassis.

3. The internal support bracket of claim 1, wherein the top cover is secured to the bottom support with one or more fasteners.

4. The internal support bracket of claim 1, wherein the top cover is further secured to the bottom support with a friction fit.

5. The internal support bracket of claim 1, wherein the top cover includes one or more protrusions from an interior surface defining a portion of a boundary of the aperture, the one or more protrusions mating with the power switch.

6. The internal support bracket of claim 1, wherein the bottom support includes one or more protrusions from an interior surface defining a portion of a boundary of the aperture, the one or more protrusions mating with the power switch.

7. The internal support bracket of claim 1, wherein the top cover and the bottom support include one or more protrusions from an interior surface defining a boundary of the aperture, the one or more protrusions mating with the power switch.

8. The internal support bracket of claim 1, wherein the ridge has a trapezoidal cross-section.

9. The internal support bracket of claim 1, wherein the ridge includes one or more blind holes.

10. The internal support bracket of claim 1, wherein the groove includes one or more side walls having one or more nodules extending from the side wall into the groove, the one or more nodules configured to engage corresponding blind holes in the ridge to secure the bottom support to the base support in a locked position.

11. A method of securing a power switch to the interior of a computer chassis, the method comprising: connecting a base support including a channel to an interior wall of a computer chassis; positioning a power switch between a top cover and a separate bottom support of an internal support bracket, the separate bottom support includes a bottom surface having a ridge protruding therefrom; securing the top cover to side walls of the separate bottom support of the internal support bracket; and sliding the ridge of the separate bottom support into the channel such that the internal support bracket including the power switch is secured in a locked position.

12. The method of claim 11, wherein the positioning includes first placing the power switch into the separate bottom support of the internal bracket followed by sliding the top cover over the power switch.

13. The method of claim 11, wherein the securing is implemented with one or more fasteners.

14. The method of claim 11, wherein the connecting of the base support to the interior wall is implemented with one or more thumb screws.

15. The method of claim 11, further comprising sliding the ridge of the separate bottom support out of the channel.

16. The method of claim 11, wherein the channel includes one or more nodules configured to engage one or more apertures in the ridge as the internal support bracket is moved to the locked position.

17. The method of claim 11, wherein the channel includes one or more nodules configured to disengage with one or more apertures in the ridge as the internal support bracket is moved to an unlocked position.

* * * * *